(12) United States Patent
Klock et al.

(10) Patent No.: US 9,775,462 B2
(45) Date of Patent: Oct. 3, 2017

(54) COOKING DEVICE WITH EGG COOKING INSERT

(71) Applicant: Spectrum Brands, Inc., Middleton, WI (US)

(72) Inventors: Casey A. Klock, Fitchburg, WI (US); Gerald J. McNerney, Middleton, WI (US); Jacob M. Levin, Verona, WI (US)

(73) Assignee: SPECTRUM BRANDS, INC., Middleton, WI (US)

( * ) Notice: Subject to any disclaimer, the term of this patent is extended or adjusted under 35 U.S.C. 154(b) by 204 days.

(21) Appl. No.: 14/518,387

(22) Filed: Oct. 20, 2014

(65) Prior Publication Data

US 2016/0106253 A1    Apr. 21, 2016

(51) Int. Cl.
*A47J 29/02*    (2006.01)
*A47J 37/06*    (2006.01)

(52) U.S. Cl.
CPC ............ *A47J 29/02* (2013.01); *A47J 37/0611* (2013.01)

(58) Field of Classification Search
CPC ........ A47J 37/0611; A47J 29/02; A47J 29/00; A47J 43/20; A47J 33/00; A47J 36/16; A47J 27/122; A47J 27/60; A47J 36/00; A47J 36/20
USPC .................................. 99/380, 372; 219/450.1
See application file for complete search history.

(56) References Cited

U.S. PATENT DOCUMENTS

| | | | |
|---|---|---|---|
| 1,706,612 A | | 3/1929 | Jaeger |
| 1,947,124 A | * | 2/1934 | Clauss ................ A47J 37/0611 425/188 |
| D162,041 S | | 2/1951 | Klein |
| 4,011,431 A | * | 3/1977 | Levin .................... A47J 37/105 219/386 |
| 4,345,516 A | | 8/1982 | Sinclair |
| 4,512,250 A | | 4/1985 | Schindler et al. |
| 4,969,449 A | * | 11/1990 | Levin .................. A47J 37/0786 126/221 |
| 5,062,408 A | | 11/1991 | Smith et al. |
| 5,606,905 A | | 3/1997 | Boehm et al. |
| D414,981 S | * | 10/1999 | Roskind ........................ D7/359 |
| 6,016,741 A | | 1/2000 | Tsai et al. |
| 6,170,389 B1 | | 1/2001 | Brady |

(Continued)

OTHER PUBLICATIONS

International Search Report and Written Opinion issued in corresponding International Application No. PCT/US2015/056386, dated Jan. 28, 2016.

(Continued)

*Primary Examiner* — Dana Ross
*Assistant Examiner* — Renee Larose
(74) *Attorney, Agent, or Firm* — Banner & Witcoff, Ltd.

(57) ABSTRACT

An egg cooking insert can be used with a cooking device having a lower cooking plate and an upper cooking plate connected to the lower plate with a floating hinge, with the egg cooking insert including a base portion having an upper surface defining a cooking surface. A wall extends upwardly about a periphery of the upper surface to define a cavity above the cooking surface. The base portion may have a thickness greater than a thickness of the wall. A bottom surface of the base portion may be angled with respect to the cooking surface. A plurality of grooves may be formed in the bottom surface of the base portion.

20 Claims, 3 Drawing Sheets

(56) References Cited

U.S. PATENT DOCUMENTS

| | | |
|---|---|---|
| 6,429,409 B1 | 8/2002 | Siu |
| 6,546,850 B1 | 4/2003 | Akiyama-Warren |
| 6,718,866 B1 * | 4/2004 | Robinson ............. A47J 37/0611 |
| | | 99/444 |
| D492,538 S | 7/2004 | Cheng |
| 6,994,017 B2 * | 2/2006 | Lerner ................. A47J 37/0611 |
| | | 99/376 |
| 7,104,187 B1 * | 9/2006 | Robinson ............. A47J 37/0611 |
| | | 99/444 |
| D549,515 S | 8/2007 | Curtin et al. |
| D643,676 S | 8/2011 | Lavy et al. |
| D679,135 S | 4/2013 | Valera |
| D679,136 S | 4/2013 | Valera |
| D679,944 S | 4/2013 | Meyer |
| D682,013 S * | 5/2013 | Huang ............................ D7/354 |
| 2003/0183625 A1 | 10/2003 | Hoh |
| 2004/0217109 A1 | 11/2004 | Chang |
| 2005/0045046 A1 * | 3/2005 | Cheng ................... A47J 27/122 |
| | | 99/422 |
| 2005/0247210 A1 | 11/2005 | Ragan |
| 2006/0049164 A1 * | 3/2006 | Bryan .................. A47J 37/0611 |
| | | 219/386 |
| 2006/0249506 A1 | 11/2006 | Robertson |
| 2006/0272511 A1 | 12/2006 | Dreimann et al. |
| 2006/0283334 A1 * | 12/2006 | Ho ....................... A47J 37/0611 |
| | | 99/372 |
| 2007/0006740 A1 | 1/2007 | Lam |
| 2008/0105137 A1 | 5/2008 | Genslak et al. |
| 2011/0011277 A1 | 1/2011 | Bond |
| 2013/0112086 A1 | 5/2013 | Lamont |

OTHER PUBLICATIONS

International Search Report and Written Opinion issued in corresponding International Application No. PCT/US2016/042768, dated Oct. 12, 2016.

* cited by examiner

COOKING DEVICE WITH EGG COOKING INSERT

FIELD OF THE INVENTION

Aspects of this invention relate generally to a cooking device and, in particular, to a cooking device for grilling food that includes an egg cooking insert.

BACKGROUND OF THE INVENTION

Cooking devices with lower and upper cooking plates are known for grilling food. The lower plate may include a ribbed upper surface and be sloped or slanted toward its front edge, allowing liquids, such as grease, to flow downwardly through grooves or channels formed between the ribs. The grease and liquids can be collected in a container or well positioned beneath the front edge of the lower plate. One exemplary cooking device is shown and described in U.S. Pat. No. 5,606,905, the entire disclosure of which is incorporated herein in its entirety for all purposes.

Liquid eggs may be cooked in an egg ring, which are typically cylindrical thin-walled members having a handle extending outwardly from an outer surface of the wall, and are open at their top and bottom. The egg ring is placed on a cooking surface, and a liquid egg is cooked therein. It would be desirable to have a cooking insert for cooking liquid eggs that is operable with a cooking device having lower and upper cooking plates as described above.

Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide a cooking device and an egg cooking insert for use with the cooking device. In accordance with a first aspect, an egg cooking insert can be used with a cooking device having a lower cooking plate and an upper cooking plate connected to the lower plate with a floating hinge, with the egg cooking insert including a base portion having an upper surface defining a cooking surface. A wall extends upwardly about a periphery of the upper surface to define a cavity above the cooking surface. The base portion has a thickness greater than a thickness of the wall.

In accordance with another aspect, an egg cooking insert can be used with a cooking device having a lower cooking plate and an upper cooking plate connected to the lower plate with a floating hinge, the lower plate being angled with respect to a horizontal surface, with the egg cooking insert including a base portion having an upper surface defining a cooking surface, and a bottom surface angled with respect to the cooking surface. A wall extends upwardly about a periphery of the upper surface to define a cavity above the cooking surface.

In accordance with a further aspect, an egg cooking insert can be used with a cooking device having a lower cooking plate and an upper cooking plate connected to the lower plate with a floating hinge, the lower plate having a plurality of ribs formed on an upper surface thereof, with the egg cooking insert including a base portion having an upper surface defining a cooking surface, and a bottom surface. A plurality of grooves are formed in the bottom surface of the base portion, with each groove configured to receive one of the ribs when the egg cooking insert is seated on the lower plate. A wall extends upwardly about a periphery of the upper surface to define a cavity above the cooking surface.

In accordance with yet another aspect, an egg cooking insert can be used with a cooking device having a lower cooking plate and an upper cooking plate connected to the lower plate with a floating hinge, the lower plate having a plurality of ribs formed on an upper surface thereof, an upper surface of the lower plate being angled with respect to a horizontal surface, with the egg cooking insert including a base portion having an upper surface defining a cooking surface, and a bottom surface angled with respect to the cooking surface. A plurality of grooves are formed in the bottom surface of the base portion, with each groove configured to receive one of the ribs when the egg cooking insert is seated on the lower plate. A wall extends upwardly about a periphery of the upper surface to define a cavity above the cooking surface. A handle is connected to connected to the base portion.

In accordance with yet a further aspect, a cooking device includes a lower cooking plate having a plurality of ribs formed on an upper surface thereof; an upper cooking plate connected to the lower plate with a floating hinge; and an egg cooking insert configured to be seated on the lower plate that includes a base portion having an upper surface defining a cooking surface, and a bottom surface angled with respect the cooking surface. A plurality of grooves is formed in the bottom surface of the base portion, with each groove configured to receive one of the ribs when the egg cooking insert is seated on the lower plate. A wall extends upwardly about a periphery of the upper surface to define a cavity above the cooking surface.

The bottom surface of the egg cooking insert may be sloped such that when the egg cooking insert is positioned on a sloped lower cooking plate of the cooking device, a cooking surface of the egg cooking insert is substantially flat or horizontal, allowing a liquid egg to be cooked in a cavity of the egg cooking insert in a uniform fashion.

In embodiments of an egg cooking insert with grooves formed on its bottom surface, complete contact of the bottom surface of the egg cooking insert with a ribbed upper surface of a lower cooking plate of a cooking device can be achieved, thereby improving the cooking time and performance of the egg cooking insert.

Additional features and advantages of an egg cooking insert for use with a cooking device as disclosed here will be further understood from the following detailed disclosure of certain embodiments.

Figure 1:
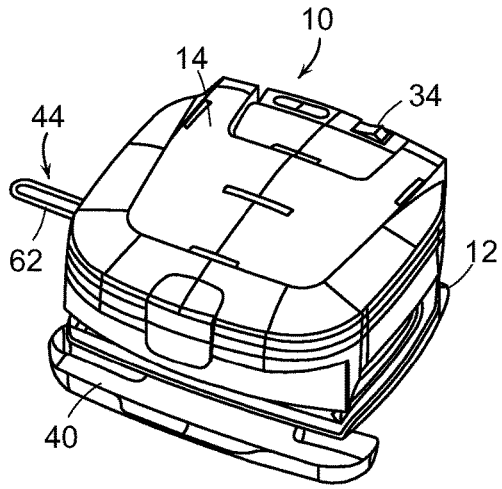
FIG. 1 is a perspective view of a cooking device in a closed condition with an egg cooking insert positioned within the cooking device.

The figures referred to above are not drawn necessarily to scale, should be understood to provide a representation of particular embodiments of the invention, and are merely conceptual in nature and illustrative of the principles involved. Some features of the cooking device and egg cooking insert have been enlarged or distorted relative to others to facilitate explanation and understanding. The same reference numbers are used in the drawings for similar or identical components and features shown in various alternative embodiments. Cooking devices with egg cooking inserts as disclosed herein would have configurations and components determined, in part, by the intended application and environment in which they are used.

DETAILED DESCRIPTION OF CERTAIN PREFERRED EMBODIMENTS

Various different examples and embodiments of the inventive subject matter disclosed here are possible and will be apparent to the person of ordinary skill in the art, given the benefit of this disclosure. In this disclosure reference to "some embodiments," "certain embodiments," "certain exemplary embodiments" and similar phrases each means that those embodiments are merely non-limiting examples of the inventive subject matter, and there are alternative embodiments which are not excluded. Unless otherwise indicated or unless otherwise clear from the context in which it is described, alternative and optional elements or features in any of the disclosed embodiments and examples are interchangeable with each other. That is, an element described in one embodiment or example should be understood to be interchangeable or substitutable for one or more corresponding but different elements in another described example or embodiment and, likewise, an optional feature of one embodiment or example may optionally also be used in other embodiments and examples. More generally, the elements and features of any disclosed example or embodiment should be understood to be disclosed generally for use with other aspects and other examples and embodiments. A reference to a component being operative or configured to perform one or more specified functions, tasks, and/or operations or the like, is intended to mean that it can perform such function(s), task(s), and/or operation(s) in at least certain embodiments, and may well be able to perform one or more other functions, tasks, and/or operations.

While this disclosure mentions specific examples and embodiments, those skilled in the art will appreciate that there are numerous variations and modifications within the spirit and scope of the invention as set forth in the appended claims. Each word and phrase used in the claims is intended to include all its dictionary meanings consistent with its usage in this disclosure and/or with its technical and industry usage in any relevant technology area. Indefinite articles, such as "a," and "an" and the definite article "the" and other such words and phrases are used in the claims in the usual and traditional way in patents, to mean "at least one" or "one or more." The word "comprising" is used in the claims to have its traditional, open-ended meaning, that is, to mean that the product or process defined by the claim may optionally also have additional features, elements, etc. beyond those expressly recited in the claim.

As used here and in the accompanying claims, directional terms used in describing a cooking device and egg cooking insert should be understood to have their ordinary meaning with reference to gravity, including, e.g., up, down, over, under, etc. Accordingly, for example, an up-down direction is vertical as that term is commonly used. It should be further understood, however, that directional or positional references to portions of a cooking device or egg cooking insert disclosed here refer to the orientation of the cooking device or egg cooking insert in ordinary use. Thus, the undersides of a cooking device and an egg cooking insert are the sides normally facing down when the egg cooking insert is positioned within the cooking device in its intended or ordinary configuration during use.

Figure 2:
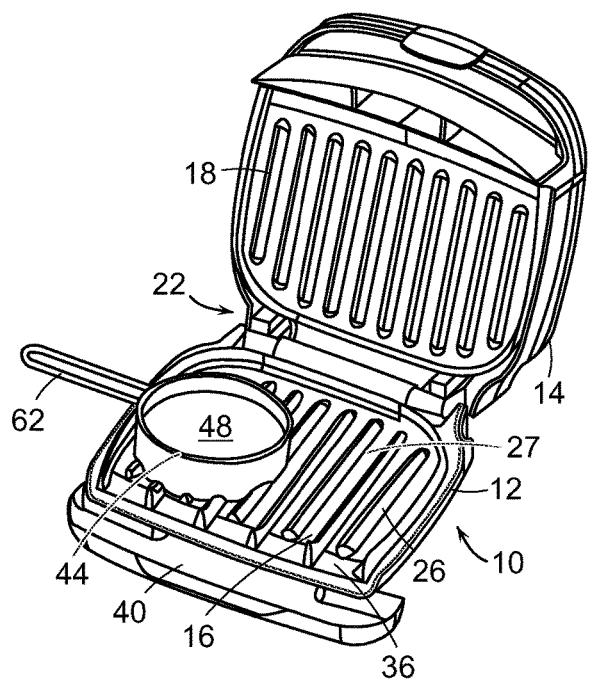
FIG. 2 is a perspective view of the cooking device of FIG. 1 in an open condition, with the egg cooking insert positioned on a lower cooking plate of the cooking device.

An illustrative embodiment of a cooking device 10 is shown in FIGS. 1 and 2. Cooking device 10 includes a base unit 12 and an upper unit 14. Base unit 12 includes a lower cooking plate 16, and upper unit 14 includes an upper cooking plate 18. In certain embodiments, each of lower cooking plate 16 and upper cooking plate 18 may be removable from cooking device 10, facilitating cleanup of the plates.

Upper unit 14 may be movable relative to base unit 12 between a closed position as seen in FIG. 1 and an open position as seen in FIG. 2. Base unit 12 and upper unit 14 are pivotally connected by a floating hinge 22 that allows upper unit 14 to move vertically, and to be pivotally moved relative to base unit 12 from the closed position to the open position. An exemplary cooking device is shown and described in greater detail in U.S. Pat. No. 5,606,905, and a suitable floating hinge is shown and described in U.S. Pat. No. 5,363,748.

Lower cooking plate 16 of base unit 12 may include an upper surface at an angle to the horizontal plane of device 10, sloping downwardly from a rear edge of lower cooking plate 16 to a front edge thereof. In certain embodiments, lower cooking plate may be sloped downwardly from back to front at an angle of approximately 8°, although any acute angle to the horizontal plane of device 10 may be utilized. In certain embodiments, lower cooking plate 16 may include a plurality of ribs 26 that act as grilling members, with corresponding grooves 27 formed between ribs 26. Ribs 26 may be of unitary, that is, one-piece construction with lower cooking plate 16. Alternatively, ribs 26 could be separately formed and subsequently secured to the upper surface of lower cooking plate 16 in any suitable manner. As illustrated here, ribs 26 are substantially hemispherical in cross-section. It is to be appreciated that ribs 26 can have any desired cross-sectional shape Ribs 26 and grooves 27 may be substantially parallel with one another, allowing liquids from cooked food to flow downwardly along lower cooking plate through grooves 27 in an unimpeded fashion. The term "substantially parallel" as used herein with respect to ribs 26 and grooves 27 is to be understood to mean that ribs 26 and grooves 27 are designed to be and are parallel to one another while taking into consideration known manufacturing tolerances.

Food cooked on lower cooking plate 16 contacts an upper surface of ribs 26. Forward, or lower end portions 28 of ribs 26 extend upwardly to a greater elevation above lower cooking plate 16 than the elevation of the remainder of ribs 26 above lower cooking plate 16. The raised end portions 28 of rib 26 prevent foodstuffs from sliding or otherwise moving down and off of inclined ribs 26.

Device 10 may include at least one heating element (not visible) operatively coupled to lower cooking plate 16 for supplying heat to lower cooking plate 16 and ribs 26. Upper cooking plate 18 may also be heated by another heating element (not visible) in a similar manner. The heating elements may be operated by way of a switch 34 mounted on upper unit 14. It is to be appreciated that switch 34 may be configured to operate the heating elements in both lower cooking plate 16 and upper cooking plate 18 simultaneously, or separately if so desired.

Figure 3:
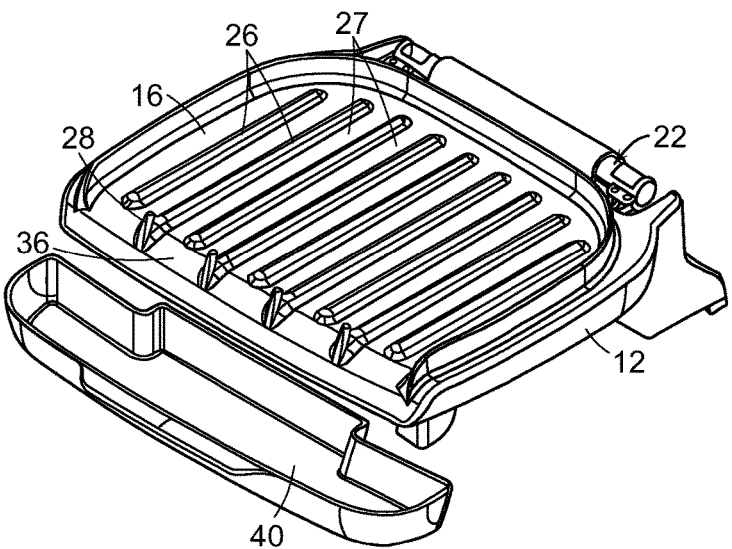
FIG. 3 is a perspective view of the base unit of the cooking device of FIG. 1, showing the lower cooking plate and a collecting member.

In embodiments where lower cooking plate 16 is sloped downwardly at an angle to the horizontal plane, liquid emitted by foodstuffs, such as grease, may be directed toward a front edge or end 36 of lower cooking plate 16 through grooves 27. As seen more clearly in FIG. 3, front end 36 of lower cooking plate 16 may be sloped or curved downwardly, allowing liquids that have been carried forwardly through grooves 27 to be directed downwardly off of front end 36 into a collecting member 40 positioned beneath front end 36. In certain embodiments, collecting member 40 may be separable from and replaceable with respect to lower cooking plate 16 and base unit 12 for removing liquid collected in collecting member 40.

As seen in FIGS. 1-2, an egg cooking insert 44 may be configured to be positioned on the upper surface of lower cooking plate 16, and beneath upper cooking plate 18 in order to cook a liquid egg therein when cooking device 10 is in its closed condition. As seen more clearly in FIGS. 4-7, egg cooking insert 44 may include a base member or portion 46 defining a cooking surface 48. Cooking surface 48 may be a planar surface, but it is to be appreciated that cooking surface 48 may have surface discontinuities formed therein including ribs, or other projections, and/or grooves or other recesses formed in or on cooking surface 48. Such surface discontinuities would naturally form mirror images of the discontinuities in an egg cooked within egg cooking insert 44.

A wall 50 having a height H may extend upwardly about a peripheral edge of cooking surface 48 defining a cavity 52 within which a liquid egg is placed in order to be cooked within cooking device 10. Cavity 52 may be designed and sized to hold the liquid egg volume of a large egg, for example. The volume of a large egg is approximately 3.05 in$^3$. In certain embodiments, the volume of cavity 52 is approximately 4.35 in$^3$, allowing for the expansion of the egg as it cooks in cavity 52. It is to be appreciated that cavity 52 can be sized to house the volume of and egg of any size.

A plurality of grooves 54 may be formed in a lower or bottom surface 56 of base member 46. Grooves 54 may be sized and configured such that they mate with ribs 26 of lower cooking plate 16. With such a configuration, when egg cooking insert 44 is placed on lower cooking plate 16, the entire bottom surface 56 of base member 46 is in contact with lower cooking plate 16, thereby increasing efficiency and reducing the cooking time of a liquid egg in egg cooking insert 44. In certain embodiments, a liquid egg may be cooked in a preheated egg cooking insert 44 and cooking device 10 in approximately three (3) minutes.

In the illustrated embodiment, grooves 54 are substantially hemi-spherical in cross-section to mate with ribs 26. It is to be appreciated that grooves 54 can have any desired cross-sectional shape. Grooves 54 may be substantially parallel with one another. The term "substantially parallel" as used herein with respect to grooves 54 is to be understood to mean that grooves 54 are designed to be and are parallel to one another while taking into consideration known manufacturing tolerances.

Figure 7:
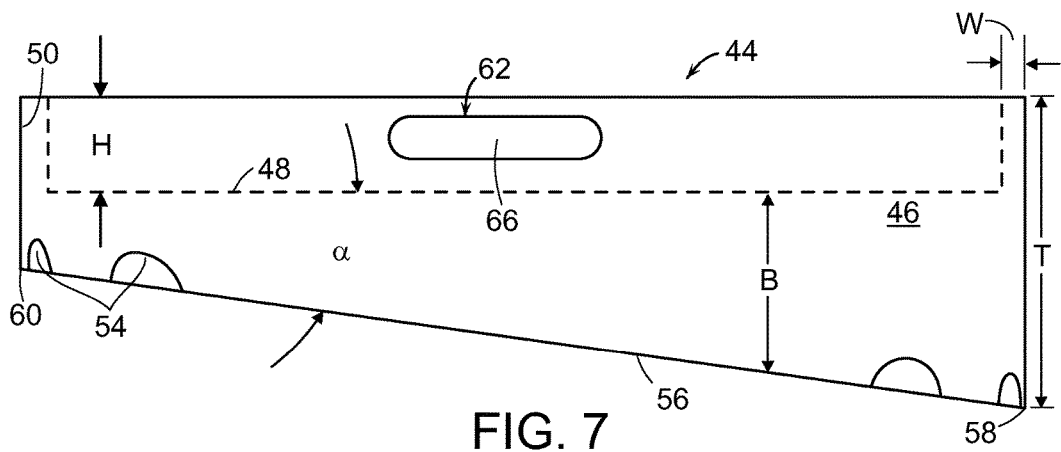
FIG. 7 is an elevation view of the left side of the egg cooking insert of FIG. 2.

As seen most clearly in FIG. 7, bottom surface 56 may be sloped or slanted at an angle $\alpha$ with respect to a horizontal plane, such as cooking surface 48. Bottom surface 56 may be sloped upwardly from a front edge 58 to a rear edge 60 thereof. In certain embodiments, angle $\alpha$ is the same as the angle at which lower plate 16 is sloped, which may approximately 15° or less. In other preferred embodiments, angle $\alpha$ may be between approximately 5° and approximately 10°. In certain preferred embodiments, angle $\alpha$ may be approximately 8°. Thus, when egg cooking insert 44 is positioned on lower cooking plate 16, the front-to-rear upwardly sloped bottom surface 56 may counteract the rear-to-front downwardly sloped upper surface of lower cooking plate 16, allowing surface 48 to be substantially level.

It is to be appreciated that the thickness B of base member 46 may be significantly larger than the thickness W of wall 50. In other words, the bottom of egg cooking insert 44 may be significantly thicker than the wall of egg cooking insert 44. In certain embodiments, thickness B may be at least approximately 150% of the thickness W of wall 50. It is to be appreciated that in embodiments as illustrated here where bottom surface 56 is at angle $\alpha$ with respect to cooking surface 48, thickness B as compared to thickness W will vary. In certain embodiments thickness B may be between approximately 150% and approximately 700% of thickness W.

It is to be appreciated that in certain embodiments the thickness W may not be constant throughout all of wall 50, and in such embodiments, thickness B is larger than the maximum thickness W of wall 50.

It is to be appreciated as well that thickness B forms a significant percentage of the total thickness T of egg cooking insert 44. In certain embodiments, thickness B may be at least 15% of the total thickness T of egg cooking insert 44. In certain embodiments, where bottom surface 56 is angled with respect to cooking surface 48, and thickness B varies across the diameter of egg cooking insert 44, thickness B may vary from approximately 15% to approximately 70% of the total thickness T of egg cooking insert 44.

Figure 8:
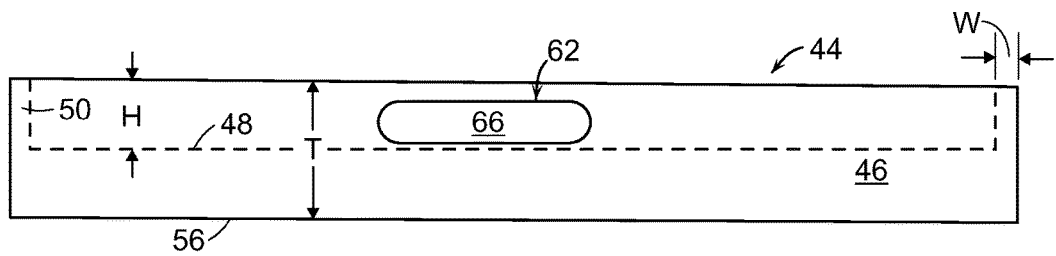
FIG. 8 is an elevation view of an alternative embodiment of the egg cooking insert of FIG. 2.
Figure 9:
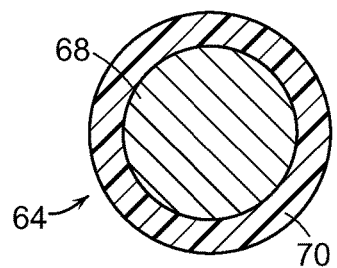
FIG. 9 is a section view of an alternative embodiment of the handle of the egg cooking insert of FIG. 2

In other embodiments, as illustrated in FIG. 8, bottom surface 56 may be substantially parallel to cooking surface 48. As illustrated here, in certain embodiments, bottom surface 56 is substantially planar, and free of any grooves.

Egg cooking insert 44 may include a handle 62 extending outwardly from base member 46. Handle 62 may extend outwardly from a left or right side of base member 46 such that when egg cooking insert 44 is contained within a closed cooking device 10, handle 62 extends outwardly from between lower cooking plate 16 and upper cooking plate 18, as seen in FIG. 1.

In certain embodiments, handle 62 may be formed of two elongate rods 64 spaced from one another and secured at first ends thereof to base member 44. A connecting member 66 may connect second ends of rods 64 to one another. In the illustrated embodiment, connecting member is substantially hemispherically shaped. It is to be appreciated that handle 62 can have any desired shape and can be secured to base member 44 in any desired fashion.

Figure 10:
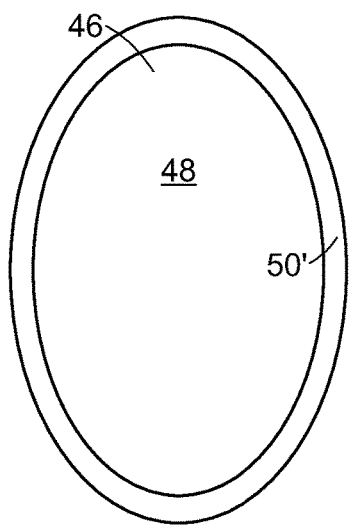
FIG. 10 is a plan view of an alternative embodiment of the base portion of the egg cooking insert of FIG. 2

In certain embodiments, as illustrated in FIG. 10, rod 64, or the entirety of handle 62, can be formed of a core member 68 and an outer member 70 encasing or surrounding core member 68. Core member 68 may be formed of metal, for example, and outer member 70 may be formed of plastic, for example. Other suitable materials for core member 66 and outer member 68 will become readily apparent to those skilled in the art, given the benefit of this disclosure.

In certain embodiments egg cooking insert 44 can be formed of aluminum or steel. Other suitable metals and materials for egg cooking insert 44 will become readily apparent to those skilled in the art, given the benefit of this disclosure. Egg cooking insert 44 may be formed by casting, or any other suitable manufacturing process.

In certain embodiments, some or all of the surfaces of egg cooking insert 44 are non-stick surfaces, allowing for improved cleanup of egg cooking insert 44. For example, cavity 52, where the egg is cooked, could have a non-stick surface while the remainder of egg cooking insert would not have such a non-stick surface. In certain embodiments, the non-stick surface could be a polytetrafluoroethylene (PTFE) based coating, an enamel coating, or a ceramic coating, for example. Other suitable materials for a non-stick surface will become readily apparent to those skilled in the art, given the benefit of this disclosure.

Figure 4:
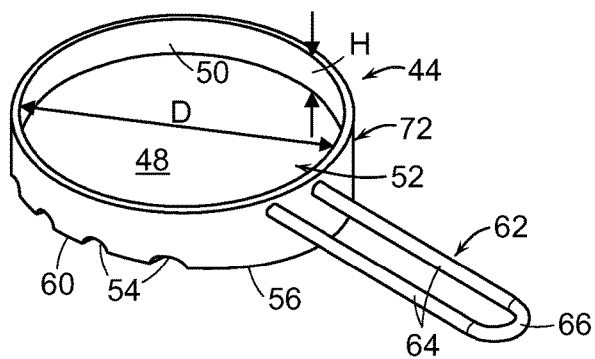
FIG. 4 is a perspective view of the egg cooking insert of FIG. 2 showing a rear side thereof.
Figure 5:
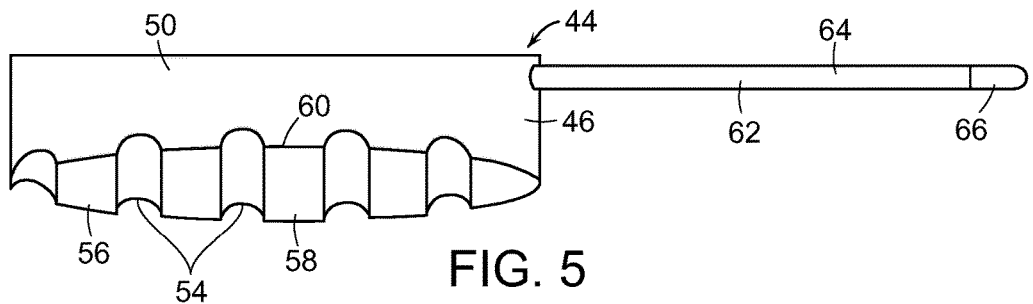
FIG. 5 is an elevation view of the rear side of the egg cooking insert of FIG. 2.
Figure 6:
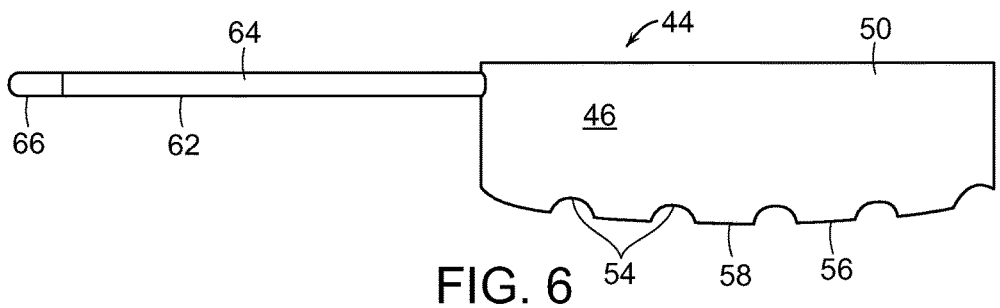
FIG. 6 is an elevation view of the front side of the egg cooking insert of FIG. 2.

In the embodiment illustrated in FIG. 4, wall 50 has a circular cross-section providing a circular cavity 52 with a diameter D, which will produce a cylindrical cooked egg. It is to be appreciated that the value of diameter D and height H of cavity 52 can be varied to produce a cavity with any desired volume, and any desired height and diameter.

Figure 11:
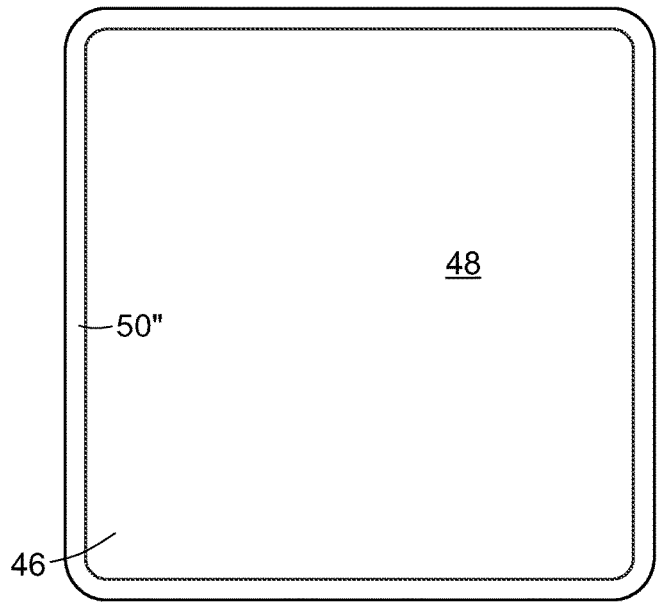
FIG. 11 is a plan view of another alternative embodiment of the base portion of the egg cooking insert of FIG. 2.

It is also to be appreciated that wall 50 can have a cross-sectional shape other than circular. For example, as illustrated in FIG. 10, a wall 50' may have an oval cross-sectional shape. As illustrated in FIG. 11, a wall 50" may have a rectangular cross-sectional shape and, more particularly, a square cross-sectional shape. It is to be appreciated that wall 50 can have any desired closed cross-sectional shape that will contain a liquid egg.

Figure 12:
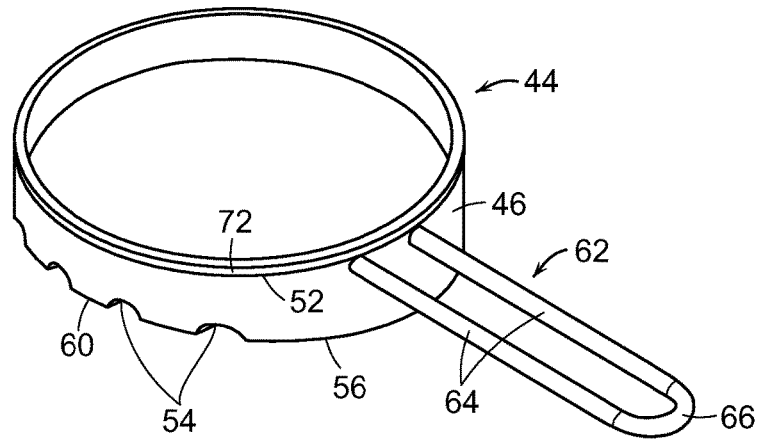
FIG. 12 is a perspective view of an alternative embodiment of the egg cooking insert of FIG. 2 showing an insert positioned within a cavity of the egg cooking insert.

In certain embodiments, as illustrated in FIG. 12, an insert 72 may be positioned within cavity 52 such that the liquid egg is wholly retained with insert 72. Once the egg is cooked, insert 72 can be removed from cavity 52 of egg cooking insert 44 and the cooked egg can be removed from insert 72. It is to be appreciated that insert 72 may be formed of a disposable material, such as a plastic material. In other embodiments, insert 72 may be formed of a metal, and may be formed of the same material as the remainder of egg cooking insert 44.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. An egg cooking insert for use with a cooking device having a lower cooking plate and an upper cooking plate connected to the lower plate with a floating hinge, the egg cooking insert comprising:
    a base portion having an upper surface defining a cooking surface an opposed bottom surface angled with respect to the cooking surface; and
    a wall extending upwardly about a periphery of the upper surface to define a cavity above the cooking surface;
    wherein the base portion has a thickness greater than a thickness of the wall, and
    wherein the cooking surface and an upper edge of the wall are substantially level when the insert is placed on the lower cooking plate.

2. The egg cooking insert of claim 1, further comprising a handle connected to the base portion.

3. The egg cooking insert of claim 1, wherein a thickness of the base portion is at least 150% of a thickness of the wall.

4. The egg cooking insert of claim 1, wherein a thickness of the base portion is at least 15% of a total height of the egg cooking insert.

5. An egg cooking insert for use with a cooking device having a lower cooking plate and an upper cooking plate connected to the lower plate with a floating hinge, the lower plate being angled with respect to a horizontal surface, the egg cooking insert comprising:
    a base portion having an upper surface defining a cooking surface, and an opposed bottom surface angled with respect to the cooking surface; and
    a wall extending upwardly about a periphery of the upper surface to define a cavity above the cooking surface,
    wherein the cooking surface and an upper edge of the wall are substantially level when the insert is placed on the lower cooking plate.

6. The egg cooking insert of claim 5, further comprising a handle connected to the base portion.

7. The egg cooking insert of claim 5, wherein the bottom surface of the base portion is angled at approximately 8° with respect to the horizontal plane of the cooking surface.

8. An egg cooking insert for use with a cooking device having a lower cooking plate and an upper cooking plate connected to the lower plate with a floating hinge, the lower plate having a plurality of ribs formed on an upper surface thereof, the egg cooking insert comprising:
    a base portion having an upper surface defining a cooking surface, and an opposed bottom surface angled with respect to the cooking surface;
    a plurality of grooves formed in the bottom surface of the base portion, each groove configured to receive one of the ribs when the egg cooking insert is seated on the lower plate; and
    a wall extending upwardly about a periphery of the upper surface to define a cavity above the cooking surface,
    wherein the cooking surface and an upper edge of the wall are substantially level when the insert is placed on the lower cooking plate.

9. The egg cooking insert of claim 8, wherein the grooves are substantially parallel to one another.

10. The egg cooking insert of claim 8, further comprising a handle connected to the base portion.

11. The egg cooking insert of claim 8, wherein an entirety of the bottom surface of the base portion is configured to contact an upper cooking surface of the lower plate of the cooking device.

12. An egg cooking insert for use with a cooking device having a lower cooking plate and an upper cooking plate connected to the lower plate with a floating hinge, the lower plate having a plurality of ribs formed on an upper surface thereof, an upper surface of the lower plate being angled with respect to a horizontal surface, the egg cooking insert comprising:
    a base portion having an upper surface defining a cooking surface, and an opposed bottom surface angled with respect to the cooking surface; and a plurality of grooves formed in the bottom surface of the base portion, each groove configured to receive one of the ribs when the egg cooking insert is seated on the lower plate;

a wall extending upwardly about a periphery of the upper surface to define a cavity above the cooking surface; and a handle connected to connected to the base portion, wherein the cooking surface and an upper edge of the wall are substantially level when the insert is placed on the lower cooking plate.

13. The egg cooking insert of claim 12, wherein the bottom surface of the base portion is angled at approximately 8° with respect to the horizontal plane of the cooking surface.

14. The egg cooking insert of claim 12, wherein the grooves are substantially parallel to one another.

15. The egg cooking insert of claim 12, wherein the entire bottom surface of the base portion is configured to contact an upper cooking surface of the lower plate of the cooking device.

16. A cooking device comprising:
a lower cooking plate having a plurality of ribs formed on an upper surface thereof;
an upper cooking plate connected to the lower plate with a floating hinge; and
an egg cooking insert configured to be seated on the lower plate and comprising:
   a base portion having an upper surface defining a cooking surface, and an opposed bottom surface angled with respect the cooking surface;
   a plurality of grooves formed in the bottom surface of the base portion, each groove configured to receive one of the ribs when the egg cooking insert is seated on the lower plate; and
   a wall extending upwardly about a periphery of the upper surface to define a cavity above the cooking surface,
wherein the cooking surface and an upper edge of the wall are substantially level when the insert is placed on the lower cooking plate.

17. The cooking device of claim 16, further comprising a handle connected to the base portion.

18. The cooking device of claim 16, wherein the bottom surface of the base portion is angled at approximately 8° with respect to the horizontal plane of the cooking surface.

19. The cooking device of claim 16, wherein the grooves are substantially parallel to one another.

20. The cooking device of claim 16, wherein the entire bottom surface of the base portion is configured to contact an upper cooking surface of the lower plate of the cooking device.

* * * * *

UNITED STATES PATENT AND TRADEMARK OFFICE
CERTIFICATE OF CORRECTION

PATENT NO. : 9,775,462 B2  
APPLICATION NO. : 14/518387  
DATED : October 3, 2017  
INVENTOR(S) : Casey A. Klock et al.

Page 1 of 1

It is certified that error appears in the above-identified patent and that said Letters Patent is hereby corrected as shown below:

In the Claims

In Column 7, Claim 1, Line 6:
Please replace "surface an opposed" with --surface, and an opposed--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*